United States Patent [19]

Grobler

[11] 4,296,932

[45] Oct. 27, 1981

[54] SEALING OF LEAKS IN TANKS AND THE LIKE

[76] Inventor: Johannes H. Grobler, 668 Main Pretoria Rd., Wynberg, Johannesburg, South Africa

[21] Appl. No.: 74,858

[22] Filed: Sep. 13, 1979

[51] Int. Cl.³ .............................................. F16J 15/02
[52] U.S. Cl. ........................................... 277/1; 138/97
[58] Field of Search ................. 277/1, 207 A; 138/97, 138/98, 99; 264/36

[56] References Cited

U.S. PATENT DOCUMENTS

| | | | |
|---|---|---|---|
| 3,227,572 | 1/1966 | Rundle et al. | 138/97 |
| 3,472,285 | 10/1969 | Ginsburgh et al. | 138/97 |
| 3,727,412 | 4/1973 | Marx et al. | 138/97 |
| 3,923,311 | 12/1975 | Tashlick | 277/1 |

*Primary Examiner*—Lenard A. Footland
*Attorney, Agent, or Firm*—Beveridge, DeGrandi, Kline & Lunsford

[57] ABSTRACT

A method of sealing leaks is disclosed comprising the use of a bituminous rubber latex emulsion. The emulsion is introduced into the passage through which a fluid is leaking by injecting, often at considerable pressures and a coagulant is used to coagulate the emulsion. Water may be used as a coagulant. Alternatively, the emulsion may be carried into the passages by the water.

4 Claims, 2 Drawing Figures

SEALING OF LEAKS IN TANKS AND THE LIKE

STATEMENT OF PRIOR ART

A wide variety of sealing materials and methods for using these has been previously proposed. Known sealants include elastomers such as silicones and polysulphides and also bituminous materials, which term includes, for the purposes of this specification, tars and pitches.

Apart from the sealing materials provided and used in sheet form, many are supplied as settable liquid materials intended for surface application. After application they set to form a flexible film. Included in this latter category are many bituminous products. One known such product comprises a bitumen/rubber latex emulsion. The latex adds a degree of elasticity to the formed bituminous film.

Other sealants are intended to be impregnated in porous materials. One such sealant comprises a siliconate (a water soluble silicone material) dispersed in rubber latex and is described in detail in U.K. Pat. No. 848,352. Although this material is said to be capable of being added to cementitious mixes to provide a plaster which is capable of withstanding hydrostatic pressure, nevertheless the material when impregnated, according to the instructions into a porous structure has not been found to be capable of sealing the concrete against water under any substantial pressure. The material when so used is capable only of sealing the porous structure against "rising damp".

It is also known to impregnate various sheet materials such as asbestos cement sheets, paper and hessian with bituminous material during the manufacture thereof.

OBJECT OF THE INVENTION

It is an object of the present invention to provide a method for sealing a fluid passage and particularly a water passage which may be used even where water is flowing through a leak in the passage in substantial quantities and/or under substantial pressure.

STATEMENTS OF THE INVENTION

According to the invention there is provided a method of sealing a fluid passage by introducing into the passage a sealing composition, characterised in that the sealing composition comprises a rubber latex and a bituminous material and it is added in sufficient quantity to form an aggregate which effectively seals the fluid passage in the presence of a coagulating agent.

The term "passage" used in this specification is intended to apply broadly to any passage through which a fluid under pressure can pass. Thus it includes a hole or crack in a wall through which water can flow or seep. Porous concrete or brickwork would include a multiplicity of "passages". Furthermore, a "passage" would exist between the lining and the rock face of a mine shaft where water could pass therebetween. A fissure or fault in a rock through which water could flow would also be a "passage".

The method may be applied where there is water, even running water, in the fluid passage when the composition is introduced.

According to one aspect the invention includes the step of introducing the sealant through a second passage which intersects the fluid passage. The second passage would conveniently be formed for the purpose of introducing the composition at a correct point in the passage desired to be sealed.

According to an alternative aspect the invention includes the step of causing the composition to be carried into the fluid passage by water. This water may be in a stream which is leaking through the fluid passage or it may be pumped by the operator into the fluid passage. Thus a leak may be sealed by introducing the composition sufficiently upstream of the leak for adequate coagulation of the composition to take place in or behind the leak. It has been found that leaks of substantial dimensions can be sealed even if water is pouring out of the leak at a high velocity and volume.

BRIEF DESCRIPTION OF THE DRAWINGS

The invention is further discussed with reference to the accompanying drawings in which;

In FIG. 1 the slab 10 is shown vertical but could equally well be horizontal. A crack 12 has occured in the slab and this has widened to the extent that water at the outer face 14 of the slab is passing through the crack and emerging at the inner face 16 in a jet. The medium 18 represents saturated soil or water.

To seal the crack 12 a passage 17 is drilled from the inner face 16 to intersect the crack. An injector, preferably of the type described in the applicant's U.S. Pat. No. 4,047,494 is inserted in the passage 17 and a quantity of bitumen/rubber latex emulsion is injected into the crack. A suitable emulsion is marketed as a surface-applied sealant under the name MULSEAL by Expandite Ltd. This emulsion contains about ten percent of latex. The water emerging from the crack at the face 16 becomes discoloured by the emulsion and within a very short time ceases to flow.

If there are extensive leaks in the slab, one or more further passages 20 may be drilled right through the slab and the same sealant injected directly into the water outside the slab. Again the water emerging from the crack becomes discoloured and after some time the leaks are sealed indicating that the water carries the sealant into the cracks and other faults.

Figure 1:
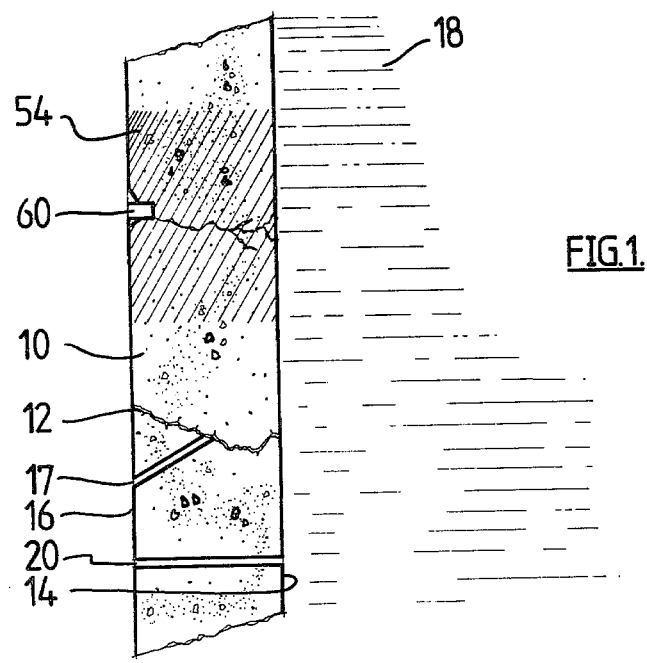
FIG. 1 is a somewhat schematic cross-sectional view of a concrete slab which represents the wall or floor or roof of a building or reservoir.

Referring again to FIG. 1, the slab 10 is frequently found to have developed fine cracks 52 and porosity 54 so that water under pressure at the outer face 14 seeps through the slab to the inner face 16. Passages 60 can then be drilled in the region of the cracks and porosity and the same sealant injected through the passages to seal the cracks and porosity.

Figure 2:
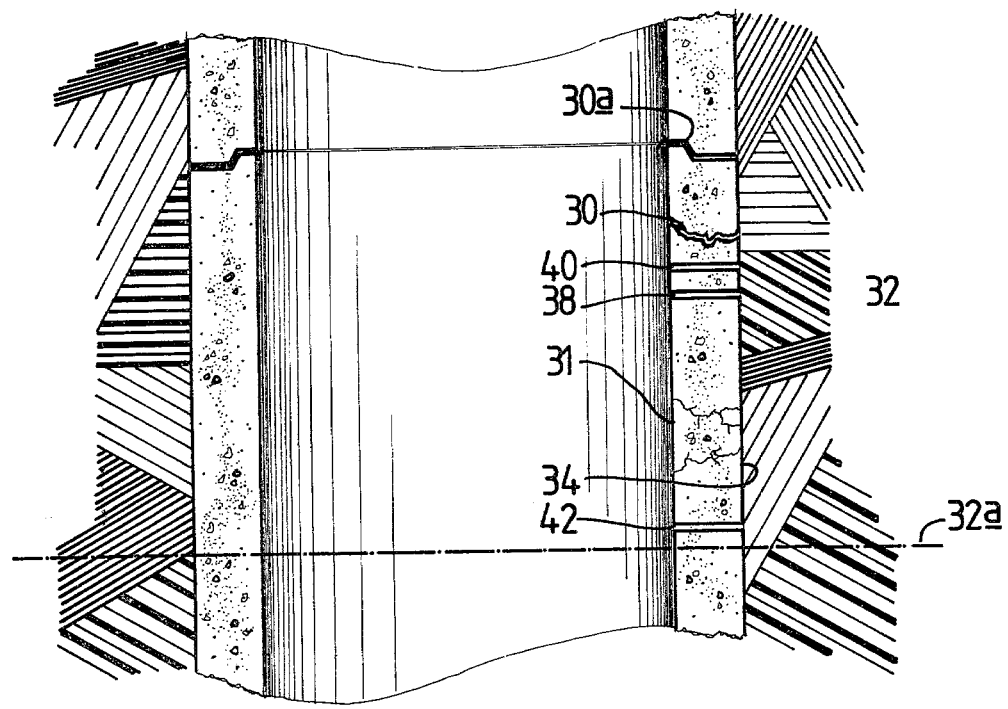
FIG. 2 is a similar schematic cross-sectional view of the lining of a mine shaft.

Referring now to FIG. 2 water was leaking extensively through cracks 30 and joints 30a in the concrete lining 31 of a mine shaft. The largest of the cracks was about thirty centimeters wide and two meters long and the water was emerging in a spout at a rate estimated to have been at least 1000 liters per minute. Investigation showed that water was penetrating through a fault in the surrounding rock 32 at a level 32a below the area where the leaks had occured and was passing upwardly between the outer face of the lining and the face 34 of the shaft. Because of the considerable flow of water it was decided first to seal the large cracks. This was achieved by drilling two passages 38 and 40 through the lining 31 below each large crack. The same sealant as previously described but with the proportion of latex doubled was injected into the water through the lower passage 38 and an accelerator in the form of dilute hydrochloric acid was injected through the upper passage 40, i.e. downstream of the point where the sealant was injected. In this way the large cracks were sealed. The flow of accelerator must be carefully controlled as it will otherwise cause the sealant to block the passages 38 and 40 before the cracks are sealed. A further passage 42 was then drilled through the lining wall below the faulty area and the sealant injected into the water. Quite soon substantially all of the leaks were sealed.

In many cases where a crack or hole is so large that the inside is visible, after sealing the sealant can be seen to have formed a coherent elastic plug. Furthermore still liquid sealant and coherent strings of sealant may be seen emerging from some of the cracks and pores at the inner face indicating that the sealant penetrates right through the cracks and pores. It is not at the present time entirely clear how the plug is formed but it would seem that the emulsion becomes susceptible to coagulation once dispersed in the water but coagulation is slow until the emulsified particles enter the passages or the accelerator is introduced. Where necessary the coagulation is accelerated by the hydrochloric acid as too much sealant might otherwise be lost if the flow of water is too great.

It should be realised that in many cases the injection pressure is of a high order. Injection pressures up to 250 kg/cm² have been used by the applicant. In the mine a water pressure of about 60 kg/cm² and an injection pressure of 150 kg.cm² were observed. When injecting the sealant into fine cracks and pores, injection pressures of up to 250 kg/cm² have been used. It is possible that the use of high pressure ensures that sealant continues to be driven into the pores and cracks even after coagulation commences so that the pores and cracks are saturated with sealant. This seems to be borne out by the fact that pure natural latex, which has been used by the applicant, appears to form a film at the entrances to fine cracks and pores when injected under very little or no pressure. Even moderate pressure causes this film to be broken. There seems to be no evidence of such a film occuring when the bitumen/latex emulsion is used. The latter furthermore has the advantage that much less sealant need be used before the leaks are sealed. This is possibly due to the presence of the bitumen which may increase the rate of coagulation particularly once the sealant has entered the pores and cracks. Usually the injection pressure is relatively low at the commencement of the operation but there is a sudden rise of the injection pressure when sealing is effected. In any case injection is not stopped until the injection pressure is well above that of the water or other fluid leaking. If the above suggestions are correct and since the coagulated sealant has considerable elasticity this would account for the fact that the plugs formed in all cases are able to accommodate considerable movement in cracks and faults while still preventing the passage of water and that once properly sealed by the method of the invention no cracks or other passages have subsequently developed leaks.

In many instances leaks occurring at considerable distances from an injection point have been sealed. Furthermore, surprisingly, some of these leaks have dried up days after the area originally sealed was injected. It would therefore appear that the emulsion remains dispersed for a considerable period and that coagulation is accelerated once the liquid carrying the emulsion enters a passage. As a result of the above observations, the applicant has found it advantageous to judge the amount of sealant required to effect sealing in particular cases where the water present was limited at the time of the operation. The injecting of sealant is stopped before the above mentioned sharp rise an injection pressure takes place, and water is then injected into the affected zones. This procedure has had a remarkable effect in obtaining an even spread of sealant over an affected zone and, incidentally, in reducing the amount of sealant required.

I claim:

1. The method of sealing a fluid passage in a body comprising forming in the body a second passage which intersects the fluid passage and introducing through the second passage to the fluid passage a composition comprising a rubber latex and a bituminous material in sufficient quantity to form an aggregate which effectively seals the fluid passage in the presence of a coagulating agent.

2. The method of claim 1 characterised in that the coagulating agent is water which carries the composition to the fluid passage.

3. The method of claim 6 characterised in that an opening exists in the fluid passage and the second passage is formed to intersect the fluid passage upstream of the opening, whereby the water carries the composition along the fluid passage via the intersection to the opening in the fluid passage, the composition coagulating in or behind the said opening, and thereby sealing it.

4. The method of claim 1 characterized in that the composition is introduced into the fluid passage under a pressure of at least 15 kg/cm².

* * * * *